March 16, 1937.   R. P. ASKUE   2,073,618
PARING KNIFE
Filed Aug. 4, 1934
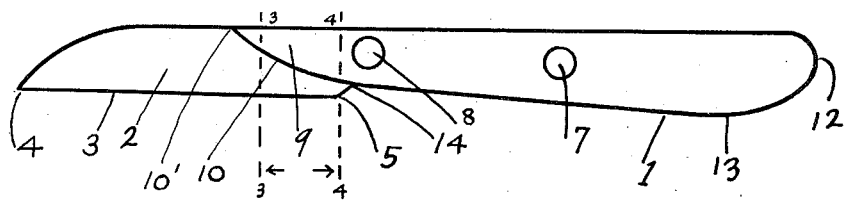
FIG. 1
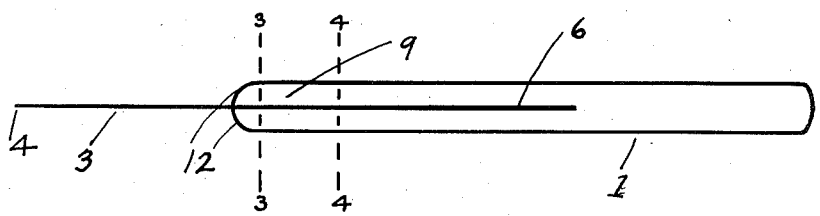
FIG. 2
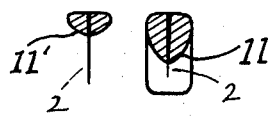
FIG. 3   FIG. 4
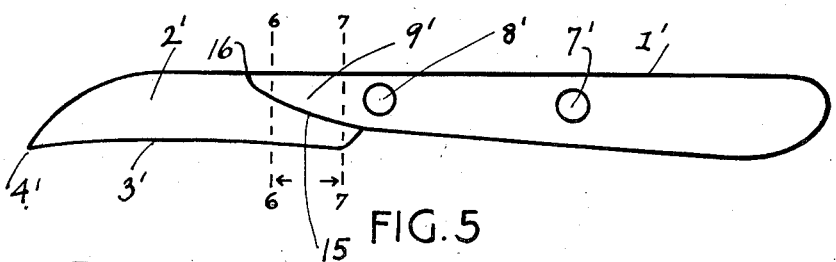
FIG. 5
FIG. 6   FIG. 7
INVENTOR
RUSSELL P. ASKUE
BY
ATTORNEY Patented Mar. 16, 1937

2,073,618

UNITED STATES PATENT OFFICE 2,073,618

PARING KNIFE

Russell P. Askue, Larchmont, N. Y.

Application August 4, 1934, Serial No. 738,453

3 Claims. (Cl. 30—9)

This invention relates to knives and particularly to knives for paring fruit, vegetables and the like.

The object of the invention generally is a knife for paring fruit, vegetables and the like which is characterized by the ease and facility with which the knife may be handled without producing blisters and callosity, by relative proportions such that the guiding or index finger may bear directly in line with the cutting range of the blade used in the paring operation and by the ease and facility with which the peelings are guided and disposed of with resultant more ease and comfort and greater efficiency in the paring operation.

A further object of the invention is a knife of the above indicated character characterized by its wearing and enduring qualities.

A better understanding of the above and further objects of the invention will appear from the following specification and drawing which form a part thereof wherein;

Fig. 1 is a side view of a knife embodying the invention;

Fig. 2 is a plan view thereof;

Figs. 3 and 4 are sectional views along the lines 3—3 and 4—4 respectively of Figs. 1 and 2;

Fig. 5 is a plan view of a slightly modified form of knife embodying the invention; and Figs. 6 and 7 are sectional views along the lines 6—6 and 7—7 respectively of Fig. 5.

Referring to Figs. 1 to 4, my invention is illustrated as embodied in a knife having a handle 1 and a blade 2. The knife blade is provided with a cutting edge 3 which in this embodiment is substantially straight, this edge terminating in a point 4 at the end and terminating rearwardly adjacent the handle 1 in a heel 5. The tang or shank of the blade is indicated at 6, and is preferably a half tang. The handle 1 may be made in one, two or more parts, preferably in one part as illustrated, with the half tang 6 of the blade disposed in a central slot formed in the handle 1 and extending a little over half way through the length of the handle. The blade and the handle are fastened together by two rivets 7 and 8, the tang 6 being provided with openings for the reception of these rivets and the rivet 8 being disposed in proximity to the heel 5 of the blade. The handle 1 projects a substantial distance along the top of the blade 2, this projection being designated by the numeral 9. The projection 9 tapers on an upward curve 10 and is bevelled off on the sides as indicated at 11 and 11', Figs. 3 and 4, as it extends along the top of the blade 2. In plan view, the two jaws of the handle 1 terminate in rounded edges 12 which in the embodiment shown together substantially form a semi-circle. The upward curve 10 terminates at 10' on a level with the upper edge of the blade 2. The projection 9 may vary somewhat in length and in shape but it should be long enough to afford a firm engagement and purchase point with the guiding or index finger utilized in the paring operations. I have found the relative proportions indicated as being particularly satisfactory, wherein the projection 9 measuring from a vertical line (line 4—4) through the heel 5 to the tip of the handle varies in length from ⅝ of an inch to 1 inch with the remaining part of the handle 1 of approximately 4 to 3¼ inches measured rearwardly therefrom. In Figs. 1-4 the length of the projection thus measured is approximately 13/16 inch and the remainder of the handle 3¾ inches, giving a proportion of 13 to 60. The handle 1 may be formed in various shapes and as is shown is provided with a somewhat blunt end 12 and thickened part 13 with the handle gradually tapering upwardly underneath to clear the cutting heel 5 of the blade and to merge with the upwardly curved part 10 of the projection 9. The tang 6 or blade 2 at no point projects above the upper level of the handle 1 either in the main gripping part or in the projecting part 9, and in the particular embodiment shown the top surface of the handle is substantially flush with the upper edge of the blade tang and the blade 1. Figs. 3 and 4 show sections along the lines 3—3 and 4—4 of Fig. 1, Fig. 4 indicating that the handle section at this point is substantially heart shaped and Fig. 3 indicating that the section at this point is of flattened heart shape.

In the usual paring operations, paring fruit, vegetables and the like, the middle and rear part of the cutting edge 3 is the active part, namely, that part of the edge extending from the heel 5 to a distance slightly in advance of the tip of the projection and guide 9. The width of the blade even at the heel 5 is substantial, as indicated at the line (choil) between point 5 and point 14 of the handle, and by means of the construction shown the index or guiding finger of the user has a range of position co-extensive with the length of the projection 9 which, as indicated, includes the larger portion of the range of the cutting edge of the blade 3 for paring operations. The mechanical efficiency of the paring is thereby improved in that the guiding or index finger bears directly down on the active cutting edge beneath, affording the best purchase point. Moreover, the under side of the projection 9 is formed of the gradual upward curve and bevel shown so as to facilitate the disposition of the parings as they are removed from the article being pared, these parings passing freely along the knife blade and guided by this under surface 10, 10', 11, 11' past the handle of the knife. Moreover, the guiding projection 9 fully protects the index finger of the paring hand and thus makes paring of fruits and vegetables and the like more comfortable and renders more efficient the paring operation.

In the conventional knife used for paring and the like, the construction is such that in attempting to gain accurate control of the knife the user necessarily causes the index finger to slip forward over the blade beyond the handle 1 which often results in soreness, blisters and callouses. With the knife above described, no such soreness or blisters is caused because the guiding and protecting projection 9 is of sufficient length and proportion with respect to the remainder of the handle and the position of the cutting heel 5 of the blade to prevent extension of the finger to the unprotected part of the blade 2. The construction is such that the user naturally grips the handle in a manner to keep the index or guiding finger upon the projection 9 substantially above the active cutting edge of the knife and the gripping of the handle in any other manner is unnatural, uncomfortable and impractical. Soreness and blisters are not only avoided and callosity minimized, but the user works more easily and more comfortably and, accordingly, does more and better work than is done with the conventional knife.

Of course, it is understood that the knife may be used for other purposes than paring above described in which case the outer end of the blade 2 becomes active in the cutting operation. Moreover, in paring operations the point 4 of the blade is used in removing blemishes from fruit and eyes from potatoes, etc. without removing the index finger from its comfortable purchase point on the projection 9 and thus facilitates these operations.

In Figs. 5–7 I have shown a slightly modified form of knife embodying the invention where the blade 2' has a curved cutting edge 3', and the shape of the projection 9' is slightly different. The under surface curve 15 of the tapering projection 9' is at first a gradual curve but changes to a more abrupt curve at the tip 16. The sections (Figs. 6–7) also show that the guiding and protecting projection 9' gradually tapers in plan view as well as in elevation. The projection 9' is somewhat shorter than the projection 9 of Figs. 1–4, namely, approximately ¾ inch, with the remainder of the handle 3$\frac{13}{16}$ inches. The drawing is approximately made to actual scale size.

The blade of the knife is preferably made of a good cutting iron or steel (preferably stainless) and the handle may be made of any suitable material, such for example as wood or bakelite or other composition. When the handle is made of wood, metal rivets, either pin or compression, are used but may be unnecessary with a molded composition handle.

I claim:

1. A paring knife comprising a blade having a cutting heel, a fastening tang and a substantially straight upper edge and a handle also having a substantially straight upper edge and secured to said tang with its upper edge substantially flush with the upper edge of the blade, said handle having an integral protecting and guiding projection extending substantially beyond said cutting heel, the upper surface of which projection is also substantially flush with the upper edge of the blade and forms a smooth continuation of the upper surface of the handle, said handle and projection being tapered within the vicinity of the projection and the heel to clear the heel for use as a paring edge and to guide the parings past the handle part, with the under surface of the tapered part being slightly convex.

2. In a knife of the character set forth in claim 1 wherein the protecting and guiding projection extends substantially beyond the cutting heel to a distance of ⅝ of an inch to 1 inch.

3. In a knife of the character set forth in claim 1 wherein the width at the top of the protecting and guiding projection is substantially the width of the handle throughout the greater portion of the length of the projection.

RUSSELL P. ASKUE.